United States Patent [19]
Sata

[11] 3,800,761
[45] Apr. 2, 1974

[54] NEW INTERNAL COMBUSTION ENGINE ACTUATOR FLUID PRODUCING NO NITROGEN OXIDE IN EXHAUST GASES, ITS MANUFACTURING METHOD AND AN APPARATUS THEREFOR

[76] Inventor: Naoyasu Sata, No. 80, Yamate-cho, Ashiya-shi, Hyogo-ken, Japan

[22] Filed: May 10, 1971

[21] Appl. No.: 141,748

[30] Foreign Application Priority Data
Dec. 19, 1970 Japan................................ 45-113655

[52] U.S. Cl............... 123/119 E, 123/1 A, 123/120
[51] Int. Cl........................................... F02m 21/00
[58] Field of Search............ 123/119 E, 119 A, 1 A, 123/120

[56] References Cited
UNITED STATES PATENTS
2,463,098 3/1949 Goddard ......................... 123/119 E
2,862,482 12/1958 Hart .................................. 123/119 E
2,884,912 5/1959 Lewis................................ 123/119 A FOREIGN PATENTS OR APPLICATIONS
884,219 4/1943 France.................................. 123/1 A
852,921 10/1952 Germany......................... 123/119 E Primary Examiner—Wendell E. Burns
Attorney, Agent, or Firm—Woodhams, Blanchard and Flynn

[57] ABSTRACT

An internal combustion engine actuator fluid which is a mixture of oxygen and an inert gas other than nitrogen is manufactured by first heating liquid oxygen and a liquid or solid inert gas other than nitrogen - which are housed in separate closed containers sealed from the external atmosphere - to gasify them therein separately, and then leading these two kinds of gases to a mixing unit to be uniformly mixed at a predetermined mixing ratio. The use of this new actuator fluid in internal combustion engines serves to produce, in the exhaust gases, no nitrogen oxides which are one of the air pollution components and are physiologically harmful to human being when installed.

10 Claims, 2 Drawing Figures

PATENTED APR 2 1974　　3,800,761

INVENTOR.
NAOYASU SATA
BY
Woodhams, Blanchard & Flynn
ATTORNEYS

NEW INTERNAL COMBUSTION ENGINE ACTUATOR FLUID PRODUCING NO NITROGEN OXIDE IN EXHAUST GASES, ITS MANUFACTURING METHOD AND AN APPARATUS THEREFOR

BACKGROUND OF THE INVENTION

1. Field of the invention

The present invention is concerned with a new internal combustion engine actuator fluid which produces no nitrogen oxides or the so-called oxidants, $NO_x$, in the exhaust gases discharged therefrom, and further the invention relates to its manufacturing method and an apparatus therefor.

2. Description of the prior art:

As is well known, the air pollution components contained in the exhaust gases expelled from internal combustion engines, especially from the engines of automobiles, comprise uncombusted fuel - which, in the case of a gasoline engine, usually consists mainly of hydrocarbons, i.e., HC; carbon monoxide, CO; and various kinds of nitrogen oxides, $NO_x$ (wherein $x$ represents an integer such as 1, 2, 3 . . . and these nitrogen oxides are collectively called "oxidants").

With respect to the first- and the second-mentioned air pollution components, there have been almost practically established means for converting them to nonnoxious substances by feeding thereto an excessive amount of oxygen-containing air to thereby relatively easily oxidize or combust them, thus converting them into water, $H_2O$, and carbon dioxide, $CO_2$. Such oxidization or combustion is effected by relying on either an "after burner" or a "catalytic oxidization." On the other hand, with respect to the third air pollution component or the so-called "oxidants," it should be noted that its absolute amount contained in the exhaust gases is relatively small as compared with the amounts of the other two, but these nitrogen oxides exert a very strong physiologically harmful action upon human beings. For this reason, extensive studies and strenuous efforts are being made by a number of experts at various different laboratories in many parts of the world to eliminate this component from the exhaust gases of internal combustion engines. However, there has been reported no successful result as yet on the attainment of this object at a low cost and in a practical and easy manner. The failure in the past to accomplish this difficult task may be attributed to the following reasons. Nitrogen, $N_2$, is an inert gas - meaning a gas which undergoes hardly any chemical reaction and which, only when mixed at 1,000°C or higher with an easily reactive gas such as oxygen, can be united with such an active gas. Nitrogen occupies about 4/5, in volume, of the atmosphere, i.e., air, the remaining 1/5 consisting mainly of oxygen, $O_2$.

In an automobile engine also, air is sucked through an air filter into the combustion zone of the cylinder in an amount four times as large as the volume of the required oxygen, and this sucked in air is subjected to a very high temperature generated by the combustion-explosion of the gasoline contained in the cylinder where the temperature can exceed 1,000°C and also generated by those sparks from the spark plugs which can produce a temperature as high as 3,000°C. Nevertheless, the oxidants which are contained in the exhaust gases are of a very trivial amount such as a few per cent of the amounts of CO or HC when measured in p.p.m. However, this trivial amount of oxidants gives intensive physiological hazards to the person who inhales same, causing irritation of eyes, headaches, coughs and/or nausea. These oxidants are extremely difficult to remove from exhaust gases and are considered at present a great nuisance to deal with. This is a major reason for the recent reevaluation of and the recent efforts to redevelop the so-called electric automobiles.

As stated above, the removal of HC and CO from the exhaust gases of internal combustion engines relies at present on the method which comprises injection of $O_2$-containing air into the combustion chambers to combust these pollution-causing components to convert them to $H_2O$ and $CO_2$. It should be noted that the inert nitrogen which is concurrently present in a large amount in the injected air also is oxidized. As a result, the amount of oxidants is caused to increase all the more. Such a dilemma is being experienced at present with no remedy therefor.

SUMMARY OF THE INVENTION

It is, therefore, an object of the present invention to eliminate the foregoing drawbacks and inconveniences of the conventional fluid required for actuating internal combustion engines and to provide a novel actuator fluid which does not produce nitrogen oxides in the exhaust gases.

Another object of the present invention is to provide a novel fluid which serves as an actuator of internal combustion engines, which, instead of the hitherto used air which contains nitrogen in an amount about four times the amount of oxygen, is a mixed gas consisting essentially of pure oxygen and at least one inert diluent gas other than nitrogen.

Still another object of the present invention is to provide the novel internal combustion engine actuator fluid of the type described which can be prepared easily and at a low cost.

A yet another object of the present invention is to provide a novel actuator fluid of the type described which can be used in conventional internal combustion engines without modifying or changing their structures at all.

A yet another object of the present invention is to provide a simplified method of manufacturing the novel actuator fluid of the type described.

A further object of the present invention is to provide an apparatus for manufacturing the novel actuator fluid of the type described, said apparatus being of a simplified structure and capable of manufacturing the said fluid economically.

A still further object of the present invention is to provide an apparatus of the type described which is compact, light-weight and yet tough and sufficiently resistive to vibration and impact due to its vacuous gas-source containers being made with a strong, tough and relatively thin material other than fragile glass because the containers require no elevated internal pressure above normal pressure.

DETAILED DESCRIPTION OF THE PREFERRED EMBODIMENT

The present invention is concerned with a novel fluid for use in actuating internal combustion engines, which is characterized by the fact that the exhaust gases discharged from such an engine does not contain any nitrogen oxide or the so-called "oxidant," $NO_x$, and also the invention relates to a manufacturing method of the said fluid and an apparatus therefor.

As stated previously, the internal combustion engine actuator fluid of the present invention does not utilize air which contains nitrogen in an amount about four times that of oxygen, but it consists of a mixture of pure oxygen and at least one inert diluent gas other than nitrogen.

As the inert gases which can be used in the present invention, there are argon (Ar), helium (He), neon (Ne), carbon dioxide ($CO_2$), water vapor ($H_2O$) and so forth. Of all these gases, carbon dioxide is the cheapest and yet thermodynamically superior to the other inert gases. For these reasons, a mixed gas consisting of about four parts by volume of carbon dioxide ($CO_2$) and one part by volume of oxygen ($O_2$) is the most suitable as the internal combustion engine actuator fluid according to the present invention.

To prepare this mixed gas, it is desirable to use liquefied oxygen (−183°C) - which has become available commercially at a much lower price of late - as the oxygen source, and to use as the carbon dioxide source commercial dry ice (solid $CO_2$, −80°C) which is also available at a low price.

Figure 1:
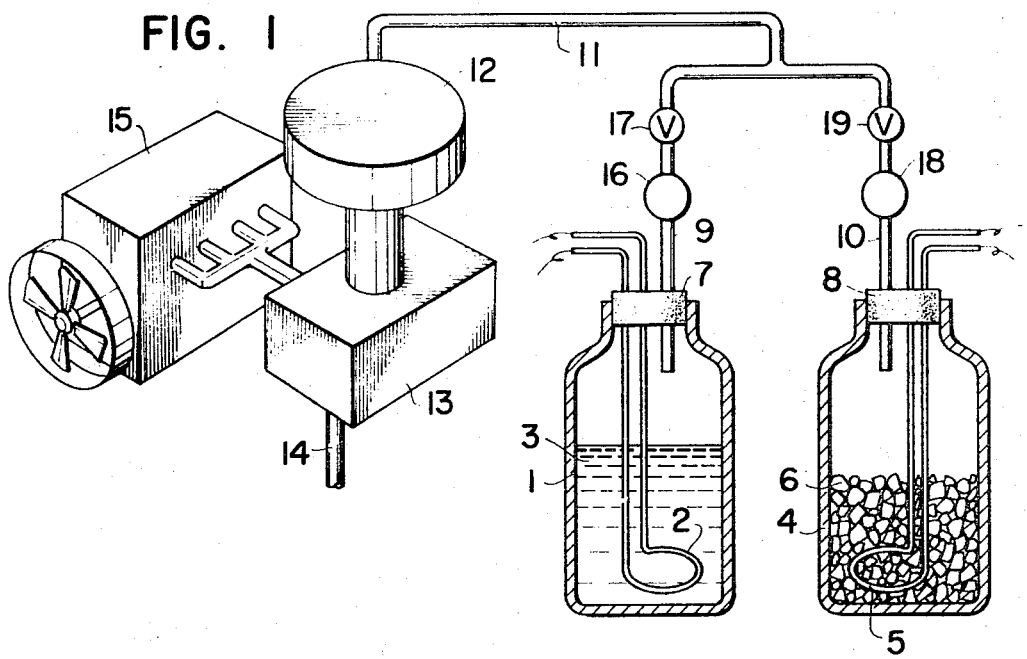
FIG. 1 is a somewhat schematic perspective view, partly in section, showing an example of the apparatus for manufacturing the internal combustion engine actuator gas of the present invention in the state of being connected with the said engine.
Figure 2:
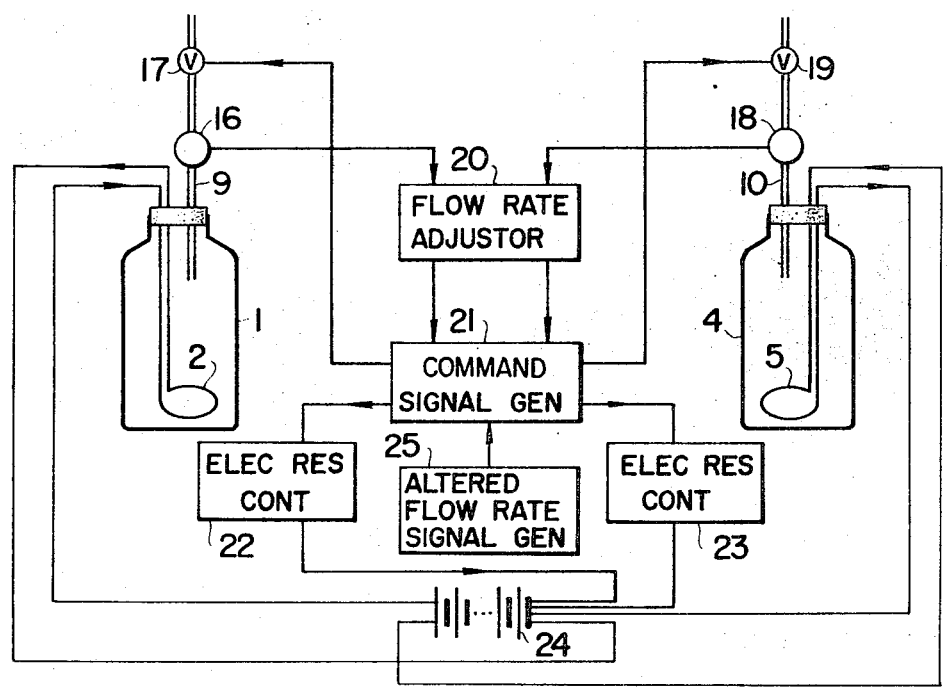
FIG. 2 is a somewhat schematic flow chart showing an example of means for producing oxygen and carbon dioxide gases from liquid oxygen and dry ice and for controlling their mixing ratio at a predetermined value.

Referring now to FIG. 1, there is shown a somewhat schematic perspective view, partly in section, of an example of the fluid manufacturing apparatus of the present invention. FIG. 2 is a somewhat schematic explanatory illustration of an example of means for controlling the mixing ratio of oxygen and carbon dioxide.

In FIG. 1, reference numeral 1 represents a thin, light-weight, shock-resistive and anti-corrosion metal vacuum bottle having normal internal pressure. It encloses therein an electric heating wire 2 which is electrically insulated therearound by a coating of, for example, molten quartz or a like material, and it also contains therein liquid oxygen 3 whose temperature is −183°C. Numeral 4 represents a similar light-weight metal vacuum bottle, which houses therein a heating means comprising an electric heating wire 5 similar to that wire 2, and further contains pieces of dry ice 6 having the temperature of −80°C. These two vacuum bottles 1 and 4 are provided with an oxygen outlet tube 9 and a carbon dioxide outlet tube 10, respectively, in such a fashion that the ends on one side of the tubes open into the bottles through sealing lids 7 and 8, respectively. The gasified liquid oxygen delivered from the bottle 1 through the oxygen outlet tube 9 and the gasified dry ice discharged from the bottle 4 through the carbon dioxide outlet tube 10 are joined together as they pass through a gas stream collecting tube 11 which communicates with a mixer 12 to deliver the mixed gases thereto. Numeral 13 represents a carburetor. Numeral 14 represents a fuel feed tube and numeral 15 represents an internal combustion engine for driving an automobile. The aforesaid oxygen outlet tube 9 is provided, in an intermediate portion thereof, with a flow rate meter 16 and a flow rate adjusting valve 17. Also, the carbon dioxide outlet tube 10 is provided, in an intermediate portion of its length, with a similar flow rate meter 18 and a similar flow rate adjusting valve 19.

In the apparatus having the foregoing arrangement, it should be understood that the vacuum bottles 1 and 4 are insulated, under normal temperature and pressure, from the external atmosphere both mechanically and thermally. This apparatus is operated in the following manner. In a manner similar to that of the use of a known immersion type water-boiler, the heating wire 2 which is enclosed in a quartz tube is connected to a power source 24 to heat the liquid oxygen 3 contained in the vacuum bottle 1 and to thereby gasify a part of this liquid oxygen 3, on the one hand. In the same way, the heating wire 5 is connected to a power source 24 to heat the dry ice 6 contained in the vacuum bottle 4 to thereby gasify a part of this dry ice 6, on the other hand. The resulting gaseous oxygen produced in the vacuum bottle 1 and the carbon dioxide gas produced in the vacuum bottle 4 are both allowed to pass - at the ratio by volume of 1 (oxygen): about 4 (carbon dioxide) - through the oxygen gas outlet tube 9 and the carbon dioxide gas outlet tube 10, respectively. Therefrom, these two kinds of gases are passed through the collecting tube 11 in joint streams. Therefrom the streams of these gases are fed to the mixer 12. In this mixer 12, the two kinds of gases are mixed uniformly. Therefrom, the mixed gases, now being the actuator fluid, are fed to the carbureter 13. At the same time, a fuel gasoline is fed through the fuel feed tube 14 into the said carbureter 13. In this carbureter 13, the fuel is atomized by the said actuator fluid. The resulting atomized mixture of the fuel and the actuator fluid is fed to the engine 15.

The actuator fluid which is fed to the carbureter 13 is a gas consisting of a uniform mixture of oxygen and carbon dioxide which are mixed at the mixing ratio of 1 : about 4 as stated above. From the foregoing statement, it will be understood that this ratio is equal to that of oxygen and nitrogen which are contained in the air which is the conventional actuator fluid. Therefore, the internal combustion engine 15 which utilizes the actuator fluid of the present invention can be a conventional engine without requiring any modification or change of the structure thereof in the least. Moreover, the engine 15 is actuated satisfactorily in exactly the same way as done by the conventional actuator fluid. Not only that, but also the engine 15 is actuated under such a condition that the combustion is effected in the absence of air. As a result, the exhaust gases discharged from the engine contain no oxidant at all.

Description will next be directed to an example of the control means for producing a controlled mixture of actuator fluid in such a manner as to be always controlled so as to consist of one part by volume of oxygen gas delivred from the metal vacuum bottle 1 which is the oxygen source reservoir and about four parts by volume of carbon dioxide gas delivered from the metal vacuum bottle 4 which is the carbon dioxide source reservoir.

The oxygen gas outlet tube 9 is provided intermediately thereof with an oxygen flow rate meter 16 and an oxygen flow rate adjusting valve 17. In the same manner, the carbon dioxide gas outlet tube 10 is provided intermediately thereof with a carbon dioxide flow rate meter 18 and a carbon dioxide flow rate adjusting valve 19. The flow rate of oxygen gas and that of carbon dioxide gas which are indicated by the number of revolutions exerted by the vanes of these two flow rate meters 16 and 18 are both detected electronically by a flow rate adjustor 20. In case the detected flow rate ratio between these two meters departs from the aforesaid 1 : about 4, a command signal generator 21 is actuated to automatically open or close the said adjustment valves 17 and 19 to maintain the flow rate ratio at 1 : about 4. Simultaneously therewith, electric resistance value controllers 22 and 23 also are actuated - upon receipt of the command from the said command signal generator 21 - to either increase or decrease the currents passing through the heating wires 2 and 5 of the respective heating means. Thus, the rates of generation of oxygen gas and carbon dioxide gas are automatically regulated. More specifically, in the electric circuits of both heating means 2 and 5 are inserted variable resistors not shown which are connected in series between 2 and 24, and between 5 and 24, respectively. The aforesaid electric resistance value controllers 22 and 23, upon receipt of the command signal from the aforesaid command signal generator 21, alter the resistance values of the said variable resistors which are connected to the batteries 24 of the automobile in accordance with the command signal to thereby increase or decrease the currents supplied to the heating means.

In case it is desired to increase or decrease the amount of the actuator fluid while maintaining the flow rate ratio at 1 : about 4, a plus or minus signal is emitted from an altered flow rate signal generator 25 - which is capable of generating electric signals in interlocked relation with the movement of the accelerator means provided on the engine 15 - to be sent to the said command signal generator 21 which in turn transmits a plus or minus command signal to both of the flow rate adjusting valves 17 and 19, and also to both of the electric resistance value controllers 22 and 23. All of the flow rate adjusting valves 17, 19 and the electric resistance value controllers 22, 23 function in accordance with the command signals as received by these members from the command signal generator 21.

The embodiment described above represents an instance in which the inert gas employed other than nitrogen is carbon dioxide produced from dry ice. It should be understood, however, that the inert gases other than nitrogen which can be used in the present invention in addition to the aforesaid carbon dioxide include argon, helium, neon and vapor of water. These latter gases are substantially no different in action from carbon dioxide excepting for negligeable points with respect to their handling. The sources of these latter inert gases may be liquefied argon, helium and neon, for example. Also, when it is desired to use carbon dioxide gas, the source therefor need not be limited to dry ice. Liquefied carbon dioxide gas may be used instead of dry ice. It should be understood, however, that liquid carbon dioxide cannot be present in the atmosphere at normal pressure. Therefore, liquid carbon dioxide will require a pressure-proof, large-sized container weighing as heavy as 100 kg. Accordingly, it will be practically impossible to carry such a heavy and large container on an automobile or an airplane.

The embodiment described above also represents an instance where the internal combustion engine is a gasoline engine for an automobile. It should be understood, however, that the present invention can be as equally effectively applied to diesel engines, rotary engines, jet engines and all other kinds of internal combustion engines so long as they are of the type intended for utilizing air as the actuator fluid.

As has been stated above, the actuator fluid of the present invention for internal combustion engines consists of mixed gases of oxygen and an inert gas other than nitrogen. Thus, the actuator fluid of the present invention contains no nitrogen at all. Accordingly, the exhaust gases discharged from the internal combustion engines which utilize this actuator fluid contain no "oxidant" at all. As a consequence, according to the present invention, there occurs no problem of air pollution due to the so-called "oxidants" which are contained in exhaust gases discharged from such engines as are designed to utilize air as the actuator fluid.

Also, as has been stated above, the actuator fluid of the present invention is manufactured by the use of liquid oxygen and a liquid or solid inert gas other than nitrogen, both of which are contained in separate sealed containers shut off from the atmosphere, and by appropriately heating both of the liquid oxygen whose temperature is −183°C and the liquid or solid inert gas to gasify them within their containers separately, and by leading the thus gasified gases to a mixing unit to uniformly mix these two gases together in the mixing unit. Therefore, the actuator fluid of the present invention can be prepared with simple processes and with surety. It should be noted especially that liquid oxygen is used as the source of oxygen. Liquid oxygen has become available quite cheaply of late. On the other hand, the sources of inert gases other than nitrogen can use not only in the liquefied form but also in the solidified form, both of which sources in these two forms are also available cheaply. Of all these, the use of dry ice is the most convenient for handling, and moreover, dry ice is easily available.

In order to gasify the gas sources of the said two kinds, it is only necessary to heat the said sources. This means, together with the fact that these sources are available cheaply, that the actuator fluid can be manufactured at a very low cost. In addition, the processes of gasifying these gas sources and of introducing the resulting two kinds of gas to a carbureter are all conducted in a state where these gases are shut off from the atmosphere, and therefore, there occurs no mingling or intrusion of nitrogen into these gases at all.

Moreover, the apparatus of the present invention for manufacturing the actuator fluid of the present invention uses sealed gas-source containers for keeping the gas sources therein separately, which - instead of being high pressure-proof, large-sized and heavy gas containers such as are used in welding using a gas - are, for example, commercially available thin, but tough and light-weight metal vacuum bottles intended for only preserving low temperature liquid oxygen and dry ice separately at normal temperature and at normal pressure (atmospheric pressure). These vacuum bottles can sufficiently resist impact and vibration unlike the usual fragile glass vacuum bottles. Thus, these metal vacuum bottles are quite convenient and suitable for being carried on both automobiles and airplanes. Also, the heating and gasifying means can use simple devices, such as the immersion-type water boiler, which each is made of an electric heating wire enclosed in a molten quartz tube for electric insulation. The flow rate meters which are provided separately from each other and the mixing unit, both of which are incorporated in the apparatus can be those of simple structures having vanes rotatably housed in casings, respectively. Thus, the apparatus as a whole can be manufactured in a compact size and at a very low cost.

It should be noted also that the actuator fluid of the present invention can be used in conventional internal combustion engines in exactly the same way as air has been used as the prior actuator fluid, and without requiring any modification or alteration of the structures of such engines.

I claim:

1. A continuous method of operating an internal combustion engine which comprises:
   vaporizing in separate containers (1) liquid oxygen and (2) liquified or solidified inert gas other than nitrogen, to form in the containers gases consisting essentially of the two materials;
   flowing separate streams of the respective two gases from the containers at controllable rates and mixing the streams of gases with each other to form a uniform mixture thereof effective for oxidizing a fuel;
   mixing the mixture of said gases with a fuel to form a combustible fuel-gas mixture; and
   igniting said fuel-gas mixture, as the sole combustible material, in an internal combustion engine, whereby no nitrogen oxides are present in the exhaust gas from the engine.

2. A method according to claim 1, in which said inert gas is selected from the group consisting of carbon dioxide, argon, helium, neon and water vapor.

3. A method according to claim 1, in which the two gases are mixed together in a volumetric ratio of 1 part by volume of oxygen gas to about 4 parts by volume of inert gas.

4. A method according to claim 1, in which (1) the liquid oxygen and (2) the liquified or solidified inert gas are stored in separate closed and insulated containers and are vaporized by electrical heating.

5. A method according to claim 1, in which the inert gas-supplying material is solid $CO_2$.

6. A method according to claim 1, in which said internal combustion engine is mounted on an automobile.

7. In combination with an internal combustion engine, apparatus for supplying combustible fuel-gas mixture to the engine, comprising:
   two heat-insulated, sealed containers made of thin, light-weight, tough, shock-resistive, corrosion-resistant material and respectively containing therein, under atmospheric pressure, (1) liquid oxygen and (2) liquified or solidified inert gas, other than nitrogen;
   heating means associated with each container for separately heating the contents thereof to vaporize said contents;
   separate conduits communicating with said containers for receiving the gases generated therein, said conduits each having flow control means associated therewith for controlling the rates of flow of the gases from the two containers;
   a mixer connected for receiving and mixing the two gases to form a uniform gas mixture;
   means for mixing the gas mixture with a fuel and means for feeding the fuel-gas mixture into the internal combustion engine, whereby no nitrogen oxides are present in the exhaust gas discharged from the engine.

8. The combination of claim 7, in which the containers are metal vacuum bottles.

9. The combination of claim 7, in which said heating means each comprises an electric heating wire enclosed in an electrically insulating material and electrically connected to a power source, the flow control means each comprises a flow rate meter and a flow rate adjustor.

10. The combination of claim 7, in which said internal combustion engine is mounted on an automobile.

* * * * *